Patented May 23, 1933

1,910,288

UNITED STATES PATENT OFFICE

JULES H. HIRT, OF EL PASO, TEXAS; HARRIET M. HIRT, EXECUTRIX OF SAID JULES H. HIRT, DECEASED, ASSIGNOR TO L. J. HIRT, OF NEW YORK, N. Y.

METHOD OF REMOVING FOUL SMELLING AND SULPHUR COMPOUNDS

No Drawing. Original application filed March 23, 1929, Serial No. 349,520. Divided and this application filed January 20, 1930. Serial No. 422,224.

My invention relates to the method of removing the foul smelling and sulphur compounds from volatile and other petroleum base liquids. Practically all distilled petroleum base liquids require purification and removal of these substances. Just what form the sulphur compounds are in, in petroleum liquids, is extremely uncertain and subject to much discussion at the present time. After many tests, I have discovered that a new porous, active, chemical compound can be readily made that has many desirable properties and will under proper conditions purify the petroleum oils from the aforesaid undesirable ingredients.

One of the objects of the invention is to produce an active chemical compound which will combine quickly with elemental sulphur. Many tests have proven that my composition will remove sulphur compounds from petroleum liquids when other regular chemical treatments have failed.

The composition, in the preferred form may be made up as follows:

A suitable iron boat pan set over a low brick fire-place is charged with 160 parts by weight of water in which is dissolved 100 parts of caustic soda and then 35 parts of powdered litharge. To the hot liquid, 200 parts of small lump caustic lime is added and the mass raked over until it becomes a dry, clinker-like porous product, the 495 parts by weight of the charge yielding 400 parts of the product. The dust dry mass still contains 65 parts of water practically all in the strong chemical combination.

The resulting product is light yellow in color, of a hydroscopic nature, slightly more than calcium carbide, yet easily kept in air tight iron containers. Exposure to sunlight for a year did not change the chemical activity of the product when kept in an air tight glass jar.

When the composition is ground in a hand porcelain mortar with elemental powdered sulphur, they will start to combine at once, as evidenced by the mixture changing color and eventually becoming black, due to the formation of lead sulphide.

The porous chemical composition is easily ground in a coffee mill type of grinder.

The composition can be used in a coarse condition for percolation upwards or downwards through it; or the screened out fines can be used in the agitating contact method of treatment.

The composition is particularly advantageous for purifying volatile petroleum base solvents due to the simple method of percolating the solvent upwards or downwards through the porous dry chemical mass contained in a closed tank under sufficient pressure to cause a flow.

Colloidal suspended matter is usually removed by percolation through dry clay after the dry chemical treatment in closed vessels, thereby avoiding evaporation losses.

The chemicals in the composition probably all exist as hydrates in an extremely active condition. If the chemical compound is strongly heated, it becomes brown in color, and when a sample of this mass is ground up with powdered sulphur in a porcelain mortar it does not react and change color showing that no chemical combination has taken place and that the heated composition is inactive.

Boiling the composition in a sulphur bearing petroleum liquid does not remove the sulphur, whereas, it will remove it in cold contact or cold percolation with the petroleum liquid. The boiling probably dehydrates the chemical compound in the petroleum liquid and makes it inactive towards sulphur compounds in solvents or oils.

Numerous experiments have been made replacing all or part of the different chemicals used in the general formula. Different alkali and alkali earth caustics were substituted. Different oxides were substituted for the litharge or simple lead oxide. The replacement of caustic lime with caustic magnesia is the second best composition and while not as active chemically towards powdered sulphur as the straight caustic lime formula, it has certain advantages on some petroleum liquids of greater color removal property. A number of variations are possible giving compositions of different chemical activity.

In these tests, the powdered material as finished, was tested on "sour gasoline" to determine its sulphur compound removal property. Starting with the hot caustic soda solution, zinc oxide was added and after boiling for a time, caustic lime was added to make the clinker a porous mass. This product was then powdered and tested on "sour gasoline" to make it "sweet", so called, that is free of hydrogen sulphide and other foul smelling compounds and non-corrosive on a polished copper strip. Starting with the same hot caustic soda solution, copper oxide, both cuprous and the cupric compounds were added in separate tests. In another test, iron oxide was substituted for the litharge. Red lead, a higher oxide than litharge was also tried as a substitute for litharge.

In none of these tests did the compound have to the same extent, the active quality that the straight caustic soda-litharge-caustic lime compound had.

In the next series of tests one-half of the caustic soda was replaced with caustic potash, and all the resultant compositions were slow in chemical reaction towards "sour gasoline." The caustic soda-potash-litharge-lime in this series of tests was also less active than the compound without the caustic potash.

Where the caustic soda was replaced entirely by caustic potash all the different metallic oxide compounds were very slow in action towards "sour gasoline", and elemental sulphur.

These tests covering many combinations showed that the caustic soda-litharge-lime compound was the most active towards "sour gasoline" and powdered sulphur.

The next tests were made to determine what the effect would be by the removal of the lime and substituting magnesia in place of the lime, using the caustic soda litharge combination.

If all the lime is replaced by caustic magnesia (dead burnt magnesia is inert) there is produced the composition, caustic soda-litharge-caustic magnesia, a product that is not as active as the straight caustic soda-litharge-caustic lime composition, yet it is practical to use it and though somewhat slower in action, its color removal property towards certain petroleum liquids is much greater than where lime is present. It is known that lime compounds on certain petroleum liquids have a tendency to produce a high color towards the red scale.

Instead of the caustic lime, practically pure lime with different percentages of magnesia including dolomite lime, which is about one-half calcium oxide and one-half magnesium oxide, were substituted. Caustic lime with small percentages of magnesium oxide gives a compound which is practically equal in chemical action to the straight caustic soda-litharge-caustic lime compound.

Numerous tests show that the caustic soda-litharge-caustic magnesia compound is not as active as the caustic soda-litharge-caustic lime compound. It is, however, practical to use it in certain cases, where there is a tendency to increase the color by the use of the lime compound as compared to the magnesia compound.

In general, repeated tests show that the caustic soda-litharge-caustic lime compound is the most active towards "sour gasoline" and elemental sulphur. The caustic soda-litharge-caustic magnesia compound is the second best. All the others will also react but much more slowly with petroleum liquids containing objectionable sulphur compounds or powdered sulphur.

The above different combinations of a caustic alkali, with the different metallic oxides and different ratios of alkali-earth compounds were made and tested, as being the most practical for economic reasons. The chemical compounds, caustic soda-litharge-caustic lime and caustic soda-litharge-caustic magnesia are stable and do not change or deteriorate after a year's time if kept in an air tight iron container.

In either the caustic soda-litharge-caustic lime or the caustic soda-litharge-caustic magnesia compound, it is evident that the working ratio of water 160—caustic soda 100—litharge 35—caustic lime or caustic magnesia 200 parts by weight can be varied a great deal and still get a final product which is active towards "sour gasoline" and elemental sulphur. However, the ratios as given are what was found most satisfactory and practical in making up 400 pound batches with a one man hand equipment and yielded a product with the greatest chemical activity and porous texture, a very desirable property for economic reasons.

It will be noted that the ingredients of my composition will not react together without the presence of water.

This application is a division of my application Ser. No. 349,520, filed March 23, 1929, which has matured into Patent No. 1,809,554, granted June 9, 1931.

I claim:

1. The method of removing foul smelling and sulphur compounds from volatile and other petroleum base liquids comprising treating the said liquids with the dry hydrous reaction product of a caustic soda solution, litharge and caustic lime at a temperature below that which will dehydrate the said product and render it inactive.

2. The method of removing foul smelling and sulphur compounds from volatile and other petroleum base liquids comprising treating the said liquids with the dry hydrous reaction product of a caustic soda solution, litharge and a compound selected from the group consisting of caustic lime, caustic magnesia at a temperature below that which will dehydrate the said product and render it inactive.

3. The method which comprises treating volatile and other petroleum base liquids with a dry hydrous reaction product of a caustic alkali solution, a metallic oxide and an alkaline earth caustic compound, that has the property of removing foul smelling and sulphur compounds from said liquids and maintaining a temperature for the treatment that is below that which will dehydrate the said product and render it inactive.

In testimony whereof I affix my signature.

JULES H. HIRT.